No. 894,361. PATENTED JULY 28, 1908.
E. BAUROTH.
FRICTION CLUTCH.
APPLICATION FILED AUG. 8, 1907.
2 SHEETS—SHEET 1.
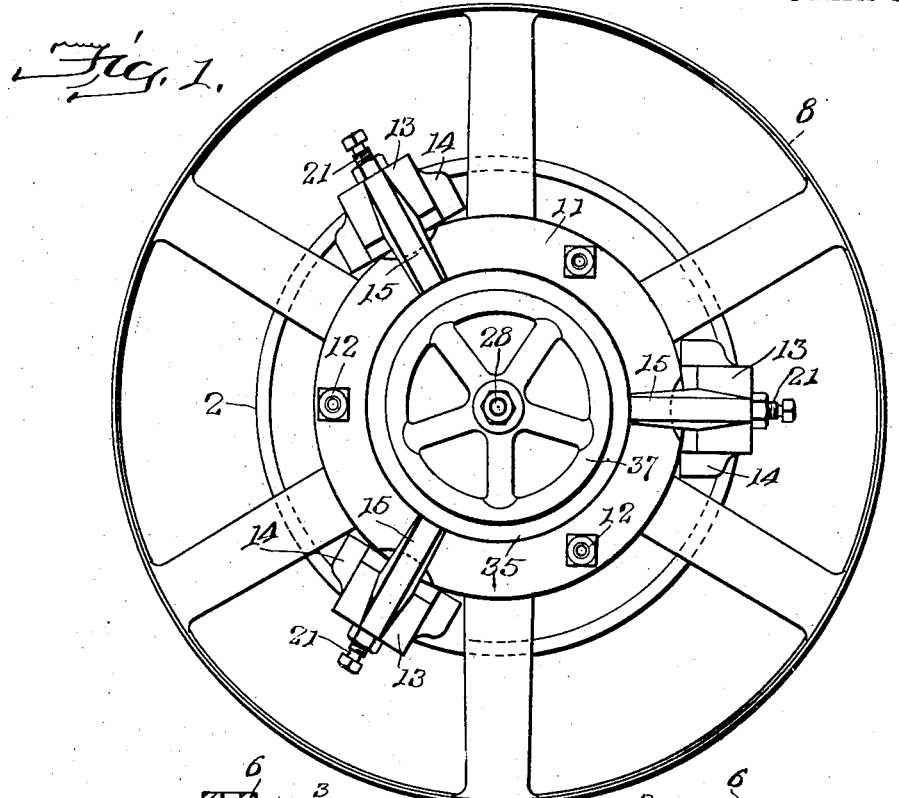
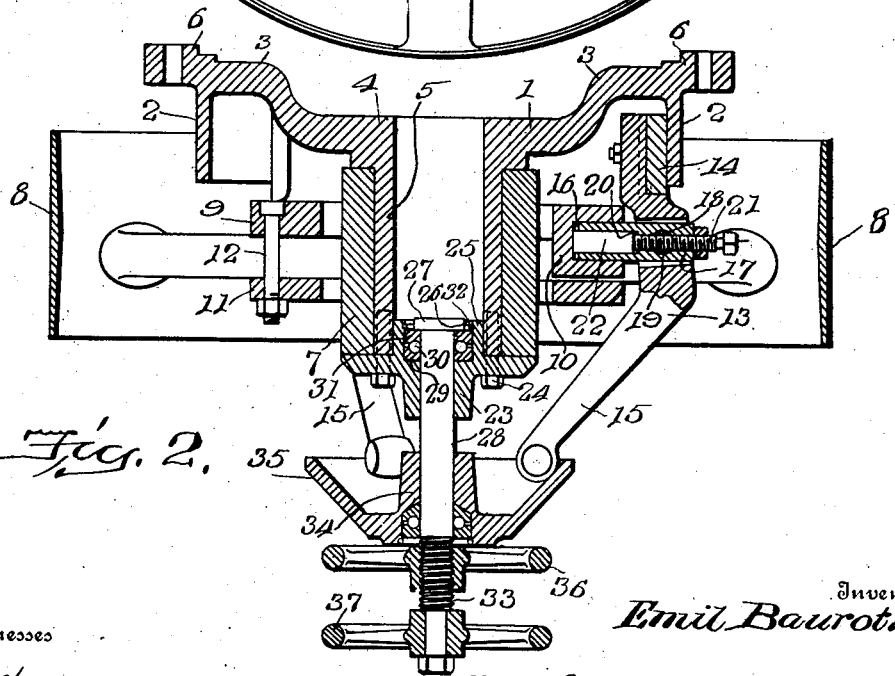
Witnesses
G. Howard Walmsley,
Edward L. Reed
Inventor
Emil Bauroth,
By H. A. Gouleuw,
Attorney No. 894,361. PATENTED JULY 28, 1908.
E. BAUROTH.
FRICTION CLUTCH.
APPLICATION FILED AUG. 8, 1907.

2 SHEETS—SHEET 2.

Witnesses
G. Howard Walmsley
Edward T. Reed

Inventor
Emil Bauroth,
By H. A. Toulmin,
Attorney

UNITED STATES PATENT OFFICE.

EMIL BAUROTH, OF SPRINGFIELD, OHIO, ASSIGNOR OF ONE-HALF TO WILLIAM F. BAUROTH, OF SPRINGFIELD, OHIO.

FRICTION-CLUTCH.

No. 894,361.  Specification of Letters Patent.  Patented July 28, 1908.

Application filed August 8, 1907. Serial No. 387,616.

*To all whom it may concern:*

Be it known that I, EMIL BAUROTH, a citizen of the United States, residing at Springfield, in the county of Clark and State of Ohio, have invented certain new and useful Improvements in Friction-Clutches, of which the following is a specification, reference being had therein to the accompanying drawings.

This invention relates to friction clutches, and the object of the invention is to produce a friction clutch which can be readily attached to existing gears and pulleys without the necessity of providing a gear or pulley of special construction to accommodate the same; which will be strong and durable, of a simple construction and not liable to become disarranged or bind in its operation; and which may be readily adjusted to regulate the frictional engagement between the friction members.

With these objects in view my invention consists in certain novel features of construction and in certain parts and combinations hereinafter to be described, and then more particularly pointed out in the claims.

Figure 3:
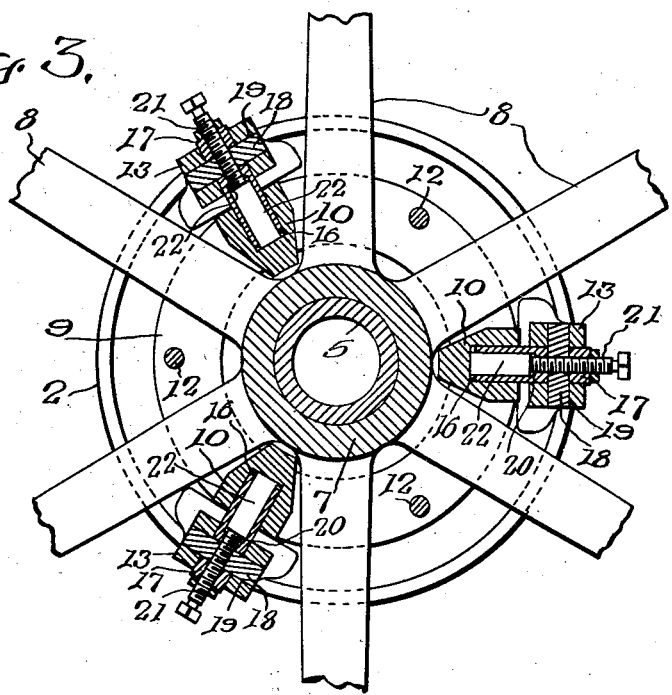

In the accompanying drawings, Figure 1 is a front elevation of a pulley equipped with my invention; Fig. 2 is a sectional view, taken centrally through the pulley longitudinally of the shaft; Fig. 3 is a sectional view, taken centrally through the pulley and extending transversely of the shaft; and Fig. 4 is a similar view of a slightly modified form of the invention.

Figure 4:
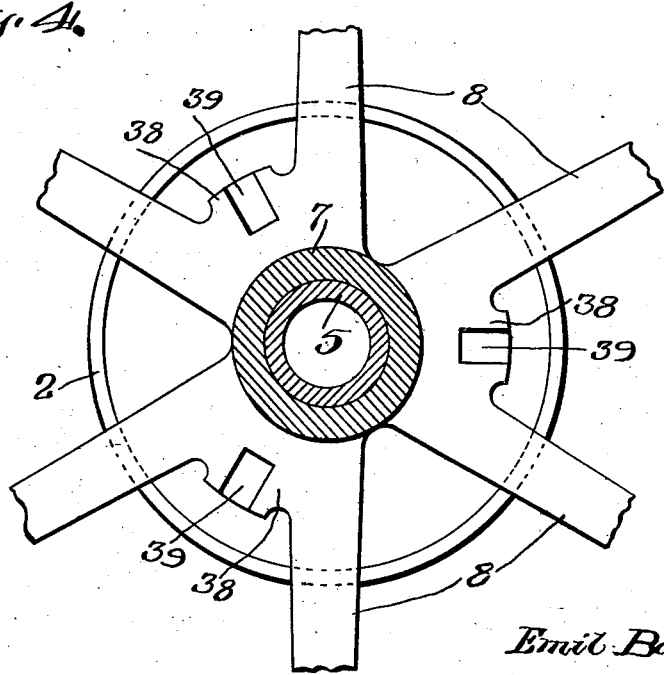

In these drawings, I have illustrated the preferred form of my invention, and in Figs. 1, 2 and 3 I have shown the same as applied to a pulley of ordinary construction, while in Fig. 4 I have shown a pulley of special construction.

As shown in these drawings my invention consists of a friction member 1 adapted to be secured to the driving shaft. This friction member, in the form herein shown, consists of a ring 2, having its inner face adapted to form a friction surface, and supported upon suitable spokes or arms 3 which are secured at their inner ends to a hub 4, which is preferably elongated to form a sleeve or hollow trunnion 5. The friction member 1 may be secured to the driving shaft in any suitable manner, but the form here shown is especially adapted for attaching it to an engine shaft and is preferably secured to the spokes of the fly wheel of the engine by means of bolts extending through the apertured lugs 6 which are carried by the friction member 1, as shown. Journaled upon the elongated hub of the trunnion 5 of the friction member 1 is the hub 7 of the pulley 8 of ordinary construction. The pulley 8 is provided with a suitable friction member or members adapted to coöperate with the friction member 1, these members preferably being pivotally mounted on the pulley and extending on the opposite sides of their pivotal centers and provided on one side with a friction shoe adapted to engage the friction ring 2 and on the opposite side with arms adapted to be operated to move the members about their pivotal center and into and out of engagement with the ring 2. These friction members may be supported on the pulley 8 in any suitable manner, but I prefer to mount the same on suitable lugs extending radially from the hub of the pulley. These lugs may be secured to the pulley by any suitable means, but I prefer the means herein shown which consist of a support such as a ring 9 adapted to extend about the hub 7 of the pulley and to be secured to the spokes thereof and having a plurality of projections 10 adapted to extend between the spokes of the pulley.

The preferred means for securing the ring 9 and projections 10 in position consists of a second ring 11, of a diameter substantially equal to that of the ring 9, located on the opposite side of the ring 9 and connected thereto by bolts 12 extending through the two rings and serving to lock the same securely in position on the pulley. The friction members, which are carried by the pulley 8, preferably consist of levers 13, pivotally mounted on the lugs 10 and having their inner ends extending within the ring 2 of the friction member 1 and provided with a friction surface 14 of suitable material, such as wood. The opposite ends of the lever 13 converge toward a central point and form arms 15, the outer ends of which are preferably rounded and adapted to be engaged by an operating member to move the levers 13 about their pivotal centers and bring the shoes 14 into engagement with the ring 2. The levers 13 may be mounted on the lugs 10 in any suitable manner, the preferred form, which is herein shown, consisting in forming in each of the lugs 10 a recess 16 extending radially of the pulley and adapted to receive a plug 17 which extends through the same and beyond the outer end thereof, where it is provided with oppositely extending trunnions 18 adapted to engage the bearing apertures 19 of the levers 13. The plug 17 is here shown as having an aperture 20 extending longitudinally thereof and having its outer end threaded to receive a set screw 21 and its inner end smooth and adapted to receive a pin 22 which extends through the smooth portion of the aperture 20 and is adapted to engage the bottom of the recess 16 at its inner end and to be engaged by the inner end of the set screw 21 at its outer end. Thus, by adjusting the set screw 21, the plug 17, upon which the levers 13 are pivoted, may be moved radially of the pulley and of the friction ring 2, whereby the amount of pivotal movement necessary to bring the friction surface 14 into engagement with the friction surface of the ring 2 may be adjusted to compensate for any wear of the friction surface.

The outer end of the hollow trunnion 5 is closed by means of a suitable cap 23 having an elongated central bearing and of a diameter greater than the outer diameter of the trunnion 5, thus causing the cap 23 to extend beyond the point of engagement of the hub 7 and trunnion 5 and prevent the entrance of dust or dirt to the bearing surfaces. This cap may be secured to the trunnion 5 in any suitable manner, such as by means of screws 24, herein shown. The cap 23 has on its inner face an inwardly extending boss 25 having a bearing recess 26, of a diameter greater than the diameter of the bearing aperture in the cap 23 and adapted to receive an enlarged head 27 of the bolt or shaft 28 which extends through the aperture in the cap 23 and for some distance beyond the outer end thereof. If desired, antifriction rollers may be interposed between the walls of the recess 26 and the head 27 of the bolt 28. As herein shown, the walls of the recess 26 are provided with a suitable race 29 adapted to receive the balls 30 which are retained in the bearing by means of a suitable collar or retainer 31 having a race on the inner face thereof. The collar 31 is held against longitudinal movement in the bearing recess 26 by means of a suitable stop, such as a spring 32. As stated, the shaft 28 extends for a considerable distance beyond the outer end of the cap 23 and has its outer end screw-threaded, as shown at 33, that portion of the shaft lying between the screw-threaded portion 33 and the outer end of the bearing being smooth and adapted to receive an operating member 34 which is slidably journaled thereon. This operating member may be of any suitable character, but I prefer that herein shown which is in the form of a truncated cone having its base open and its upper end closed, thus providing a hollow member having its side walls 35 flared outwardly on the side adjacent to the pulley and adapted to engage the outer ends of the arms 15, and, as the operating member 34 is moved towards the pulley, to rock the levers 13 about their pivotal center and move the friction shoes 14 into contact with the friction ring 2. The operating member 34 may be adjusted upon the shaft 28 in any suitable manner, but I prefer the form herein shown in which I have mounted the hand wheel 36 upon the screw-threaded portion 33 of the shaft 28 and have rigidly secured a second hand wheel 37 to the outer end of said shaft. Thus, by holding one of said wheels stationary and turning the other, the position of the operating member 34 on the shaft 28 may be adjusted and the frictional contact between the shoe 14 and the ring 2 may be regulated.

While I prefer to construct my invention as herein shown, that is, as a detachable device adapted to be mounted on an existing pulley or gear, I may dispense with the detachable rings which carry the supporting lugs for the pivoted arms 13 and may cast these lugs integral with the pulley itself, as shown at 38 in Fig. 4, the lugs being formed between the adjacent spokes and having radial apertures 39, similar to and for the same purpose as the apertures 16 in the lugs 10.

The operation of the device will be readily understood from the description of the operation of the several parts thereof and it will be apparent that I have provided a friction clutch which can be readily attached to an existing pulley or gear, and that the whole may be easily mounted upon the shaft of an engine by bolting the friction member 1 to the fly wheel of the engine; that the construction is simple and not liable to become disarranged or to permit the several parts to bind in their operation; that the device may be easily operated to move the friction members into engagement one with the other and to regulate the frictional engagement between said members; and further that the device is strong and durable in its construction and the parts thereof are not liable to become broken under the strain which is imposed thereon.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, a friction member adapted to be secured to a driving member, a driven member comprising a hub portion having spokes, friction members movably mounted between said spokes, extending longitudinally of said hub and having their supports in substantially the same vertical plane with said spokes and means for actuating said friction members to bring the same into contact with the first-mentioned friction member.

2. In a device of the character described, a friction member adapted to be secured to a driving member, a driven member comprising a hub portion having spokes, levers pivotally mounted between said spokes, extending longitudinally of said hub and having their supports in substantially the same vertical plane with said spokes, friction members carried by said levers and adapted to engage the first-mentioned friction member, and means for moving said levers about their pivotal centers.

3. In a device of the character described, a friction ring adapted to be secured to a driving member, a driven member, an annular support removably mounted on said driven member, levers pivotally mounted on said support in substantially the same vertical plane with said spokes and extending transversely of said driven member, friction members carried by the inner ends of said levers and adapted to engage said friction ring, and means for engaging the outer ends of said levers to move the same about their pivotal centers.

4. In a device of the character described, a friction ring adapted to be secured to a driving member, a driven member rotatably mounted near said driving member, a ring removably mounted on said driven member, and having projections thereon, levers pivotally mounted on said projections, friction shoes near one of said levers adapted to engage said friction ring, and means for engaging the opposite ends of said levers for moving the same about their pivotal centers.

5. In a device of the character described, a friction ring adapted to be secured to a driving member, a driven member, rings arranged on opposite sides of said driven member, one of said rings having projections thereon, means for connecting said rings one to the other, levers pivotally mounted on said projections, friction members carried by said levers near one end thereof and adapted to engage said friction ring, and means for engaging the opposite ends of said levers to move the same about their pivotal centers.

6. In a device of the character described, a friction ring adapted to be secured to a driving member, a driven member having radial spokes, removable lugs carried by said driven member between and in substantially the same vertical plane with the spokes thereof, friction members pivotally mounted on said lugs and adapted to engage said friction ring, and means for moving said friction members about their pivotal centers.

7. In a device of the character described, the combination, with a friction ring adapted to be secured to a driving member and having an elongated hub portion, of a driven member journaled on said hub portion and having radial spokes, a support carried by said driven member between the spokes thereof, and a friction member adjustably mounted on said support and adapted to engage said friction ring.

8. In a device of the character described, the combination, with a friction ring adapted to be secured to a driving member and having an elongated hub, of a driven member journaled on said elongated hub, levers pivotally mounted on said driven member having friction shoes near one end thereof adapted to engage said ring and having their opposite ends extended to form arms, a shaft supported from said hub, an operating member mounted on said shaft and adapted to engage said arms, and means for actuating said operating member.

9. In a device of the character described, the combination, with a friction ring adapted to be secured to a driving member and having an elongated hub, of a driven member journaled on said hub, levers pivotally mounted on said driven member and having friction shoes carried by one end thereof and adapted to engage said friction ring and having their other ends extended to form actuating arms, a shaft rotatably supported from said hub, a cone-shaped operating member slidably mounted upon said shaft and adapted to engage the ends of said arms, and means for moving said operating member longitudinally of said shaft.

10. In a device of the character described, the combination, with a friction ring adapted to be secured to a driving member and having an elongated hub, of a driven member journaled upon said elongated hub, levers pivotally mounted on said driven member and having friction shoes at one end thereof adapted to engage said friction ring and having their opposite ends converging, a cap secured to the outer end of said hub having a bearing therein, a shaft journaled in said bearing, a cone-shaped operating member slidably journaled on said shaft and adapted to engage the converging ends of said levers, and means for actuating said operating member.

11. In a device of the character described, the combination, with a friction ring adapted to be secured to a driving member, of a driven member, supports carried by said driven member, friction members pivotally mounted on said supports and adapted to engage said friction ring, and means for adjusting the pivotal centers of said friction members radially of said driven member.

12. In a device of the character described, the combination, with a friction ring adapted to be secured to a driving member, of a driven member, apertured lugs carried by said driven member, radially extending plugs mounted in said apertured lugs and having a radial aperture therethrough, a pin mounted in said aperture and adapted to engage said driven member, and a set screw mounted in the outer end of said aperture and adapted to engage the adjacent end of said plug, and friction members pivotally mounted on said plugs.

13. In a device of the character described, the combination, with a friction ring having an elongated hub and adapted to be removably secured to a fly wheel, of a driven member rotatably mounted on said elongated hub, removable supports carried by said driven member, levers pivotally mounted on said supports, friction members secured to the inner ends of said levers and adapted to engage said friction ring, and means for engaging the outer ends of said levers to move the same about their pivotal centers.

14. In a device of the character described, the combination, with a friction ring having an elongated hub portion and adapted to be removably secured to a fly wheel, of a driven member journaled on said elongated hub portion, a ring arranged concentrically of said hub portion and removably secured to said driven member, projections carried by said ring, friction members pivotally mounted on said projections, means for adjusting said friction members radially of said gear, a shaft rotatably supported in the outer end of said elongated hub, an operating lever slidably mounted on said shaft and adapted to actuate said friction members, and means for moving said operating member longitudinally of said shaft.

In testimony whereof, I affix my signature in presence of two witnesses.

EMIL BAUROTH.

Witnesses:
A. C. LINK,
EDWARD L. REED.